(12) United States Patent
Ward

(10) Patent No.: US 12,169,317 B2
(45) Date of Patent: Dec. 17, 2024

(54) MULTI-CONFORMABLE MODULES FOR FIBER OPTIC CABLE DISTRIBUTION SYSTEMS

(71) Applicant: OPTERNA AM, INC., Sterling, VA (US)

(72) Inventor: Phil Ward, Milton Keynes (GB)

(73) Assignee: OPTERNA AM, INC., Sterling, VA (US)

( * ) Notice: Subject to any disclaimer, the term of this patent is extended or adjusted under 35 U.S.C. 154(b) by 0 days.

(21) Appl. No.: 17/015,064

(22) Filed: Sep. 8, 2020

(65) Prior Publication Data

US 2021/0072479 A1    Mar. 11, 2021

Related U.S. Application Data

(60) Provisional application No. 62/897,143, filed on Sep. 6, 2019.

(51) Int. Cl.
*G02B 6/00* (2006.01)
*G02B 6/38* (2006.01)
*G02B 6/44* (2006.01)

(52) U.S. Cl.
CPC ......... *G02B 6/4441* (2013.01); *G02B 6/3897* (2013.01); *G02B 6/4452* (2013.01); *G02B 6/4471* (2013.01)

(58) Field of Classification Search
CPC .. G02B 6/4441; G02B 6/3897; G02B 6/4452; G02B 6/4471; G02B 6/4446; G02B 6/00
See application file for complete search history.

(56) References Cited

U.S. PATENT DOCUMENTS

| 6,208,796 | B1 | 3/2001 | Williams Vigliaturo |
| 8,213,761 | B2 * | 7/2012 | Gronvall ............. G02B 6/4441 |
| | | | 385/139 |
| 9,851,524 | B2 * | 12/2017 | Vongseng ............ G02B 6/4455 |
| 2006/0147172 | A1 * | 7/2006 | Luther ................. G02B 6/4441 |
| | | | 385/139 |
| 2009/0202214 | A1 | 8/2009 | Holmberg et al. |
| 2013/0089292 | A1 | 4/2013 | Ott et al. |
| 2013/0242506 | A1 | 9/2013 | Keith |

(Continued)

FOREIGN PATENT DOCUMENTS

WO    2016156524 A1    10/2016

OTHER PUBLICATIONS

Search Report dated Nov. 30, 2020 in corresponding International Application No. PCT PCT/US20/49789, 2 pages.

(Continued)

*Primary Examiner* — Jennifer Doan
(74) *Attorney, Agent, or Firm* — MH2 TECHNOLOGY LAW GROUP LLP

(57) ABSTRACT

An optical fiber interface housing includes a body having a first end and an opposite second end, a port at the first end of the body, an opening at the second end of the body; and a boot coupled with the port. The boot and the port are configured to receive a fiber optic cable containing at least one optical fiber and to permit the at least one optical fiber to pass through the body from the first end to the second end. The opening is configured to receive the at least one optical fiber and to permit the at least one optical fiber to pass through the opening and exit the body.

22 Claims, 13 Drawing Sheets

(56) References Cited

U.S. PATENT DOCUMENTS

| | | | |
|---|---|---|---|
| 2014/0233892 A1* | 8/2014 | Gurreri | G02B 6/26 |
| | | | 385/71 |
| 2016/0018615 A1 | 1/2016 | Czosnowski et al. | |
| 2016/0209599 A1* | 7/2016 | Van Baelen | G02B 6/3849 |
| 2018/0059326 A1 | 3/2018 | Makrides-Saravanos | |
| 2018/0129006 A1 | 5/2018 | Solheid et al. | |
| 2019/0113704 A1 | 4/2019 | Potter et al. | |
| 2019/0129116 A1 | 5/2019 | Henley et al. | |
| 2020/0124812 A1* | 4/2020 | Dannoux | G02B 6/3851 |
| 2020/0132957 A1* | 4/2020 | Beri | G02B 6/3809 |

OTHER PUBLICATIONS

Written Opinion dated Nov. 30, 2020 in corresponding International Application No. PCT PCT/US20/49789, 6 pages.
Extended European Search Report dated Sep. 11, 2023 in corresponding European Application No. 20859816.9, 7 pages.

\* cited by examiner

MULTI-CONFORMABLE MODULES FOR FIBER OPTIC CABLE DISTRIBUTION SYSTEMS

CROSS-REFERENCE TO RELATED APPLICATION

This application claims the benefit of U.S. Provisional Application No. 62/897,143, filed Sep. 6, 2019, the disclosure of which is hereby incorporated by reference herein in its entirety.

TECHNICAL FIELD

The present disclosure relates generally to optical communication networks. More particularly, the present disclosure relates to modules for fiber optic cable distribution systems.

BACKGROUND

There are many types of optical communication networks, sometimes referred to as FTTx networks. For example, FTTx networks include fiber to the curb (FTTC) networks, fiber to the premises (FTTP) networks, fiber to the business (FTTB) networks, fiber to the home (FTTH) networks, and fiber to the antenna (FTTA) networks. The required cable management components, for example, cable management spools and cable guides, and fiber optic components, for example, adapter plates, splitters, and splice cassettes, depend on the particular FTTx network application. These cable management components and fiber optic components are typically housed within an enclosure. The particular configuration of these cable management components and fiber optic components within the enclosure can vary greatly depending on the required components and the physical location at which the components are being deployed. For example, some applications require top cable access to the enclosure, while other application may require bottom cable access to the enclosure. And other applications may require both top and bottom cable access to the enclosure. Further, some physical locations may require that the enclosure's cover swing in a particular direction. Within the enclosure, the cable management components and the optical components must be configured a certain way to accommodate such design requirements and to minimize any bend loss.

Because of continually increasing demand by end users, increasing the capacity of fiber optic distributions systems is desired. Particularly, higher density fiber optic distribution systems are desired. Typical components of fiber optic distribution systems have density limitations based on the size of an adapter, splitter, or the like and the size of fiber optic connectors that are connected to such adapters, splitter, or the like. Accordingly, it may be desirable to provide an interface for an adapter, splitter, or the like that can achieve a higher density than that of conventional devices. More particularly, it may be desirable to provide an interface that does not have a density limitation based on the size and number of fiber optic connectors that are optically coupled at the interface.

Further, it may be desirable to provide a modular fiber distribution assembly that allows the cable management components and the fiber optic components within the enclosure to be easily configured depending on the particular application such that the same fiber distribution assembly can be reconfigured for use in a variety of FTTx applications.

SUMMARY

According to various aspects of the disclosure, an optical fiber interface housing includes a body having a first end and an opposite second end, a port at the first end of the body, an opening at the second end of the body; and a boot coupled with the port. The boot and the port are configured to receive a fiber optic cable containing at least one optical fiber and to permit the at least one optical fiber to pass through the body from the first end to the second end. The opening is configured to receive the at least one optical fiber and to permit the at least one optical fiber to pass through the opening and exit the body.

In some aspects, the optical fiber interface housing further includes a furcation cable coupled with the boot. The furcation cable is configured to receive the optical fiber and to permit the optical fiber to pass therethrough to the port.

According to various aspects, the fiber optic cable is a multi-fiber cable containing a plurality of optical fibers. In some aspects, the plurality of optical fibers of the multi-fiber cable are broken out of the fiber optic cable in the body and pass separately through the opening at the second end of the body.

In various aspects, the optical fiber interface housing further includes a second opening at the second end of the body. The plurality of optical fibers of the multi-fiber cable are broken out of the fiber optic cable in the body and pass separately through the opening and the second opening at the second end of the body.

According to some aspects, the first end of the body include a plurality of openings, each of the openings being configured to removably receive a respective plug. In various aspects, a first one of the plugs includes the port. In some aspects, a second one of the plugs includes an additional port. In some aspects, a second one of the plugs comprises a blank that block a respective one of the openings.

In various aspects, the body has a size and shape configured to match a size and shape of a Lucent Connector (LC) quad adapter or a size and shape of a Subscriber Connector (SC) duplex adapter.

In accordance with various aspects of the disclosure, a module configured to be mounted in a chassis of a fiber distribution system includes a module body having a front end a rear end and an opening at the front end configured to removably receive one of the aforementioned optical fiber interface housings.

According to some aspects, the module further includes a splitter at an interior of the module body. The at least one optical fiber is optically coupled to an input of the splitter.

In some aspects, the module further includes a second opening at the front end, the second opening being configured to removably receive a second optical fiber interface housing. A plurality of optical fibers that are optically coupled to outputs of the splitter are configured to pass through the second optical fiber interface housing.

In various aspects of the module, the plurality of optical fibers are contained in a multi-fiber cable and are broken out from the multi-fiber cable in the second optical fiber interface housing and separately exit the second optical fiber interface housing.

According to some aspects of the module, the second optical fiber interface housing includes a plurality of furcation cables configured to receive respective ones of the plurality of optical fibers as the plurality of optical fibers exit the second optical fiber interface housing.

In various aspects of the module, the plurality of optical fibers are contained in a multi-fiber cable that passes through and exits the second optical fiber interface housing.

In some aspects of the module, the multi-fiber cable is coupled with a breakout a distance downstream of the second optical fiber interface housing. The plurality of optical fibers are broken out of the multi-fiber calbe at the breakout and separately pass through respective ones of a plurality of furcation cables after exiting the breakout.

According to various aspects of the module, the fiber optic cable is a multi-fiber cable containing a plurality of optical fibers. The plurality of optical fibers of the multi-fiber cable are broken out of the fiber optic cable in the body and pass separately through the opening at the second end of the body.

According to some aspects, the module further includes a second opening at the front end, the second opening being configured to removably receive a Lucent Connector (LC) quad adapter or a Subscriber Connector (SC) duplex adapter. Each of the plurality of optical fibers is optically coupled to a port of the LC quad adapter or the SC duplex adapter.

The foregoing and other features of construction and operation of the invention will be more readily understood and fully appreciated from the following detailed disclosure, taken in conjunction with accompanying drawings. Throughout the description, like reference numerals will refer to like parts in the various embodiments and drawing figures.

DETAILED DESCRIPTION OF EMBODIMENTS

Although certain embodiments of the present invention are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

As a preface to the detailed description, it should be noted that, as used in this specification and the appended claims, the singular forms "a," "an," and "the" include plural referents, unless the context clearly dictates otherwise.

Figure 1:
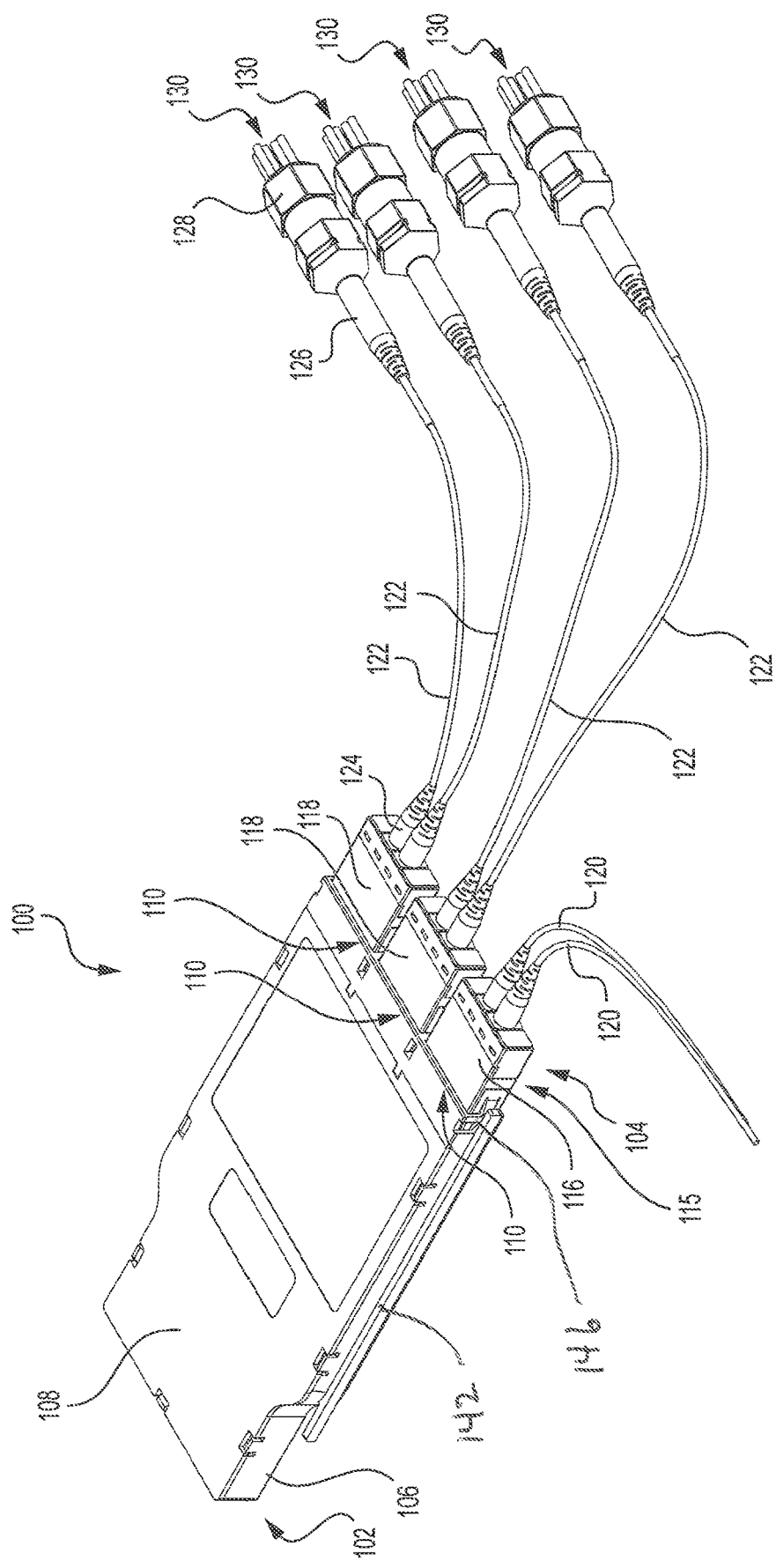
FIG. 1 is a perspective view of an exemplary module for fiber optic cable distribution systems in accordance with various aspects of the present disclosure.
Figure 3:
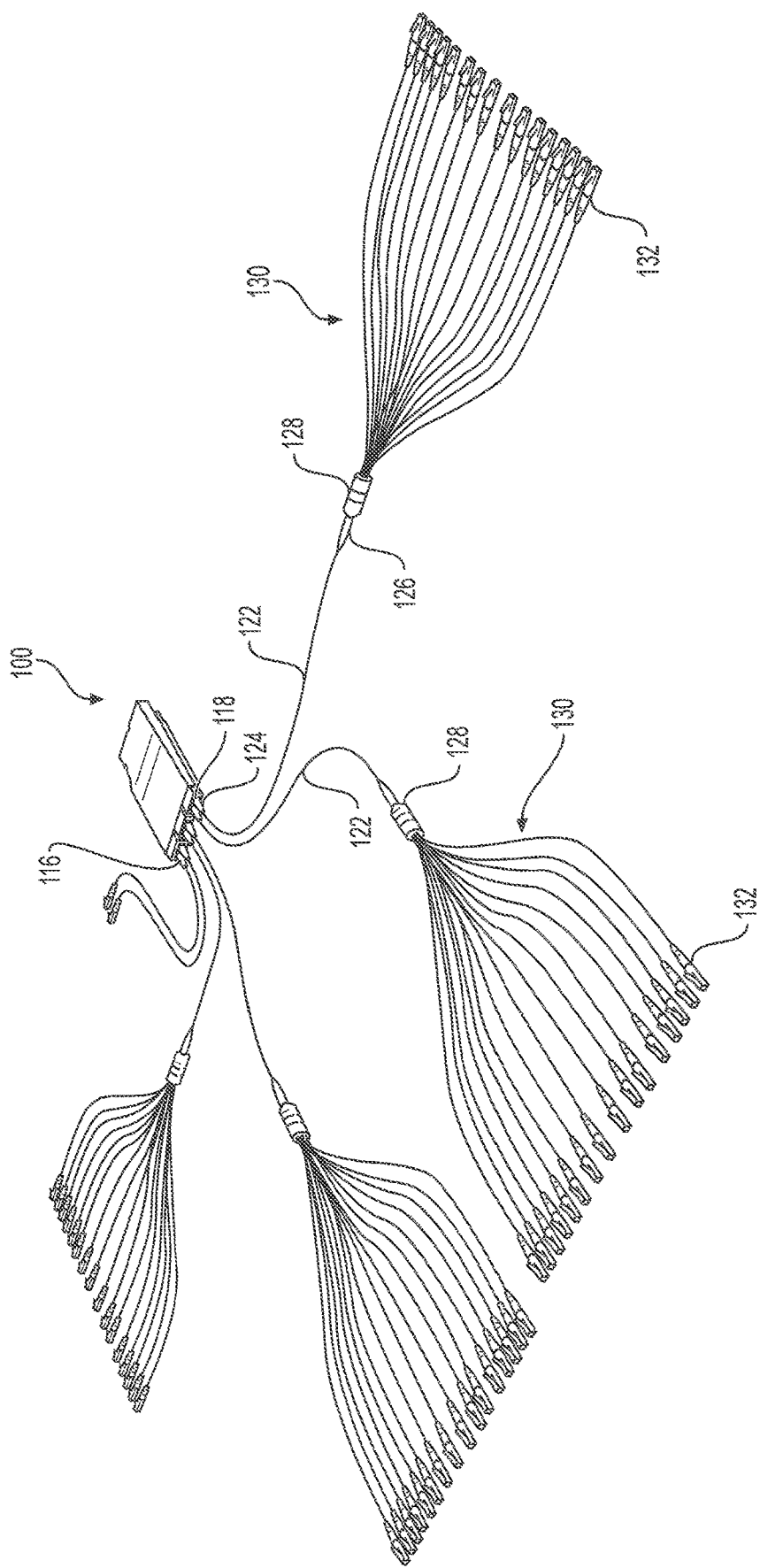
FIG. 3 is another perspective view of the exemplary module of FIG. 1.

Referring to the drawings, FIGS. 1 and 3 depict an exemplary embodiment of a module 100 for fiber optic cable distribution systems according to various aspects of the disclosure. The module 100 may also be referred to as a cassette or a cartridge. The module 100 is configured to be mounted in any fiber distribution hub or enclosure that includes a chassis 590, such as that shown in FIGS. 7-10, having compartments 592 with rails 593 into which rails 142 of the module 100 can be snap-fit, as will be described in more detail below.

The module 100 includes a module body having a front end 104 and a rear end 102. In some aspects, the module 100 includes a module base 106 and a module cover 108. The module base 106 and the module cover 108 are configured to be coupled to one another, for example, by a snap-fit connection or any other convention coupling structure. The module 100 may contain one or more optical splitters 440 (see FIG. 5) that are configured to split a signal from a single optical fiber into a plurality of signals transmitted over a plurality of optical fibers, as would be understood by persons of ordinary skill in the art.

In some embodiments, the module 100 can be configured to provide all cable inputs and outputs at the front end 104 of the module 100, as shown in FIG. 1. In such embodiments, the front end 104 of the module 100 includes may include a number of openings 110 each configured to receive an optical fiber interface housing 115. For example, the housing 115 may include one or more flexible fingers 144 configured to be coupled with a corresponding coupling structure 146 of the module 100. In the embodiment of FIGS. 1 and 3, the module 100 includes three openings 110 that are each configured to match the size and shape of an opening that is configured to receive a standard Lucent Connector (LC) quad adapter or a standard Subscriber Connector (SC) duplex adapter. In some aspects, the module 100 may include more or less than three openings, with each opening being any desired size and shape, including openings configured to receive conventional adapters or non-conventional adapters. For example, in some embodiments, the module 100 may include six openings that are each configured to match the size and shape of an opening that is configured to receive a standard LC duplex adapter or a standard SC simplex adapter. In other embodiments, for example, the module 100 may include twelve openings each configured to match the size and shape of an opening that is configured to receive a standard LC simplex adapter.

Figure 2:
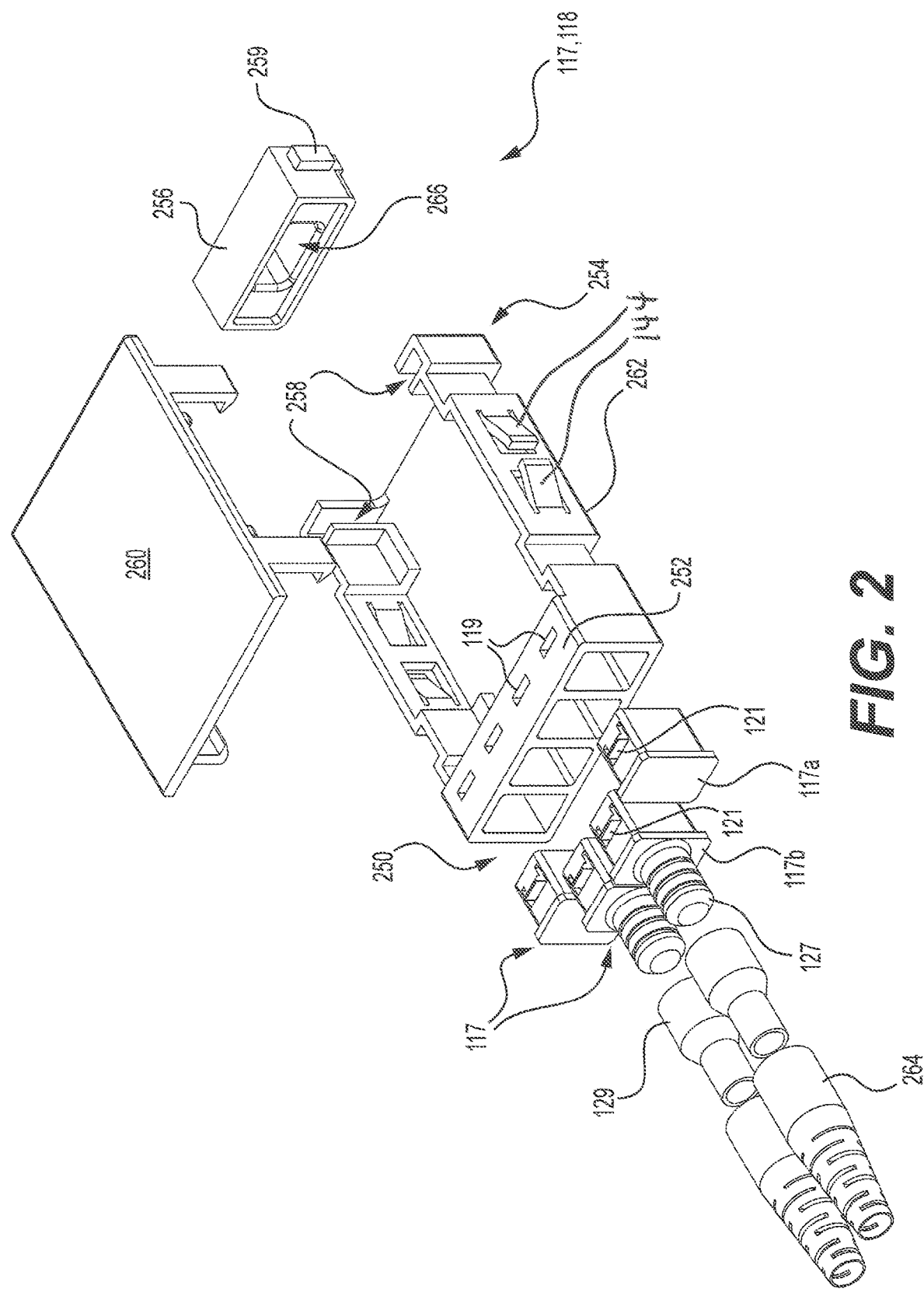
FIG. 2 is an exploded view of an exemplary interface housing used in the exemplary module of FIG. 1.

Referring again to the exemplary embodiment of FIGS. 1 and 3, the fiber interface housings 115 may include an input housing 116 and two output housings 118. In the embodiment of FIGS. 1 and 3, the input housing 116 and the output housings 118 are sized and shaped to match the size and shape of a standard LC quad adapter (or a standard SC duplex adapter). As best illustrated in FIG. 2, in some embodiments, one or more of the fiber interface housings 115 may comprise a body that includes a first end 250 and a second end 254. The first end 250 may be configured to removably receive four interface plugs 117. For example, each of the plugs 117 may include a projection 121 extending from the top and/or the bottom wall of the plug 117. The housings 115 may include one or more openings 119 in the top wall 252 and/or the bottom wall configured to receive the projection(s) 121 in a snap-fit relationship, for example. Of course, any means for coupling the plugs 117 with the housing 115 may be used. It should be understood that the first end 250 may include a separate opening configured to receive each one of the plugs 117, or the first end 250 may include one or more openings that are each configured to receive more than one of the plugs 117. It should also be understood that the first end 250 may be configured to receive more or less than four plugs.

As shown in FIG. 2, the second end 254 of the fiber interface housing 115 may be configured to receive one interface plug 256. For example, the second end 254 may define openings 258 configured to receive projections 259 extending from side walls of the plug 256. A top portion 260 can be attached to a bottom portion 262 of the housing 115 to maintain the plug 256 in the openings 258. It should also be understood that the second end 254 may be configured to receive more than one plug. For example, the second end 254 may be configured similar to the first end 252. Alternatively, the first end 250 may be configured similar to the second end 254.

The fiber interface housing 115 may include blank interface plugs 117a and/or populated interface plugs 117b. Referring to the exemplary embodiment of FIG. 2, the housing 115 includes two blank interface plugs 117a and two populated interface plugs 117b. The populated plugs 117b may include a boot 264 configured to provide strain relief to a fiber optic cable that passes through the boot 264. Each boot 264 may be coupled to a port 127 of the plugs 117b via a connecting member 129. In some embodiments, interface plug 256 may include an opening 266 that permits one or more fiber optic cables to pass through the second end 254 of the housing 115 and into an interior 105 (see FIG. 5) of the module 100.

As shown in the exemplary embodiment of FIGS. 1 and 3, furcation cables 120 can be coupled with each of the boots 264. The furcation cable 120 direct optical fibers (not shown) to the interior 105 of the module 100. Each of the furcation cables 120 may include a fiber optic cable (not shown) therein. Each fiber optic cable may contain one or more optical fibers. For example, in some embodiments, each furcation cable 120 may include one fiber optic cable that contains one optical fiber. In other embodiments, each furcation cable 120 may include one fiber optic cable that includes two optical fibers. It should be understood that any desired configuration of fiber optic cables and optic fibers can be implemented.

In the exemplary embodiment of FIGS. 1 and 3, each of the two furcation cables 120 includes one fiber optic cable, and each fiber optic cable includes one optical fiber. Each of the fiber optic cable passes through a respective one of the boots 264 and one of the interface plugs 117b, through the input interface housing 116, out the opening 266 of the interface plug 256, and into the interior 105 of the module 100. Within the module 100, the optical fiber of the fiber optic cable is optically coupled (e.g., spliced) with a splitter, for example, as an input to a 1×32 optical splitter. Thirty-two optical fibers (not shown) are optically coupled (e.g., splice) to outputs of the 1×32 optical splitter. The thirty-two optical fibers may run individually from the optical splitter to one of the output interface housings 118, or the thirty-two optical fibers may be bundled into one or more fiber optic cables.

The thirty-two optical fibers pass through the opening 266 of the interface plug 256, through the input interface housing 116, through the interface plugs 117b, and into furcation cables 122. For example, sixteen optical fibers pass through each of the two interface plugs 117b and into one of the furcation cables 122. The sixteen optical fibers may be separate or bundled. The sixteen optical fibers pass through the furcation cable 122 and into a breakout 128 where the sixteen optical fibers are broken out into sixteen fiber optic cable 130 so that each cable 130 can be run to a different location of the FTTx application. The breakout 128 may include a boot 126 configured to provide strain relief to a fiber optic cable that passes through the boot 126. Each of the optical fiber cables 130 has an end distal of the breakout 128, relative to the module 100, that is terminated with an optical fiber connector 132 such as, for example, an LC connector, an SC connector, or the like.

As described above, the module 100 has a front end 104 that is sized to received three conventional LC quad adapters (or three conventional SC duplex adapters). The three conventional LC quad adapters would provide twelve ports at the front end 104 of the module 100. Thus, provided that the module 100 could include an input cable at the rear end 102, the maximum number of outputs that could be made at the front end 104 of the module 100 would be twelve LC connections (or six SC connections). However, according to the embodiment of FIGS. 1-3, the module 100 can provide sixteen optical fiber outputs at each of four of the interface plugs 117b, which results in sixty-four optical fiber outputs, while additionally providing optical fiber inputs at each of two of the interface plugs 117a. Also, the configuration of the module 100 and the interface housing 118 permits the sixty-four optical fiber outputs to be furcated downstream a distance from the module 100. For example, in some embodiments, the furcation cables 122 may be seven meters long. Thus, the front end 104 of the module is not congested, and a technician can more easily access the individual cables 130 that exit the breakout 128 for connection to a fiber optic adapter in order to provide signals to different locations of the FTTx network.

In some embodiments, the module 100 may include four 1×16 splitters and each of the furcation cables 120 can include two optical fibers (either in one fiber optic cable or in two separate fiber optic cables). Each optical fiber would be optically coupled (e.g., spliced) to one of the splitters, which would in turn be optically coupled to sixteen optical fiber outputs. Thus, depending on the desired number of fiber optic output cables 130, the capacity of the optical splitter (e.g., 1×4, 1×8, 1×16, 1×32, etc.), the bundling capacity of the fiber optic input cables and output cables, and the breakout capacity of the breakout 128, the number of input and output housings 116, 118, the number of furcation cables 120, 122, the number of splitters, and the number of breakouts 128 can be customized for a wide variety of FTTx applications, as would be understood by persons of ordinary skill in the art.

Figure 4:
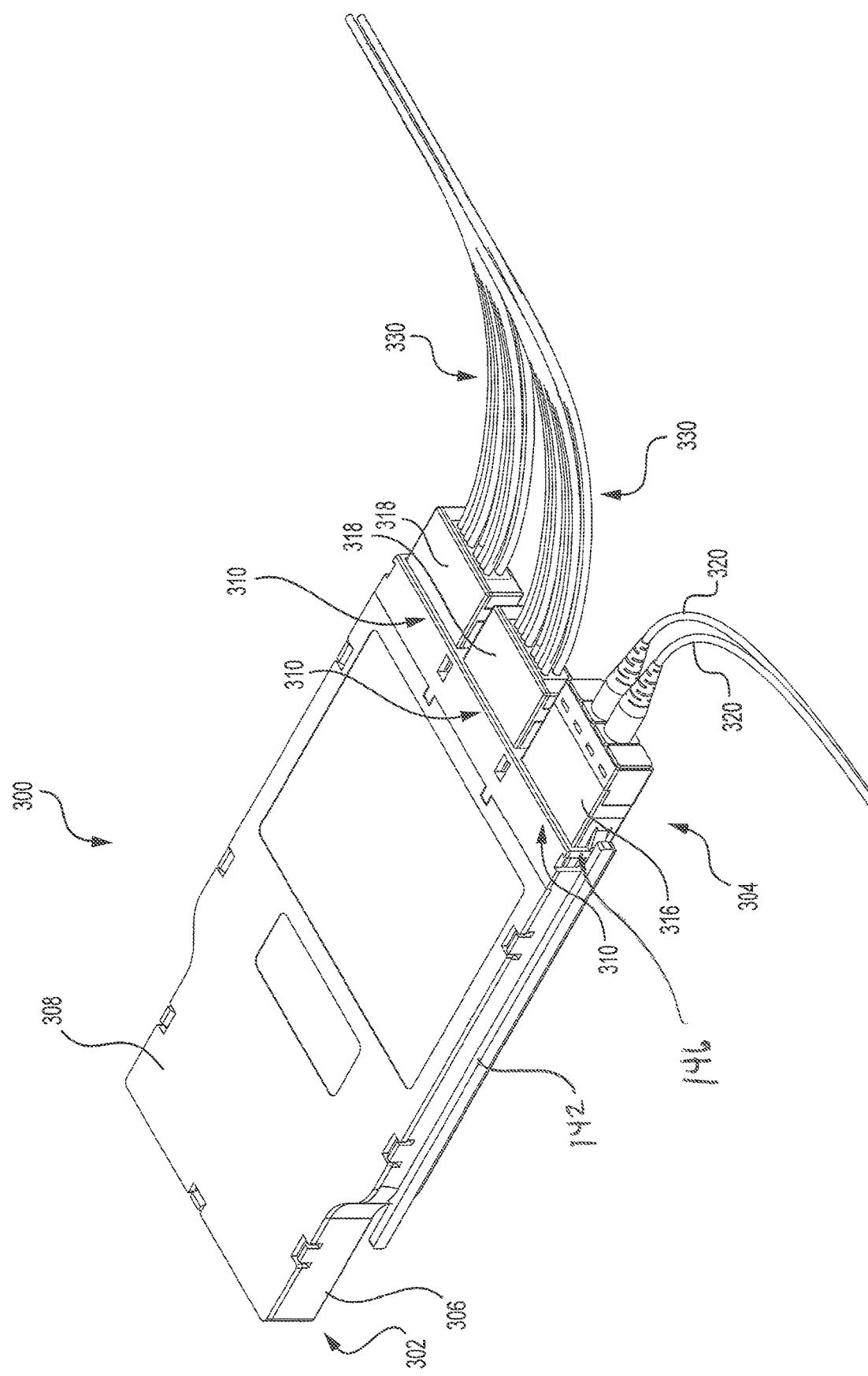
FIG. 4 is a perspective view of another exemplary module in accordance with various aspects of the present disclosure.
Figure 5:
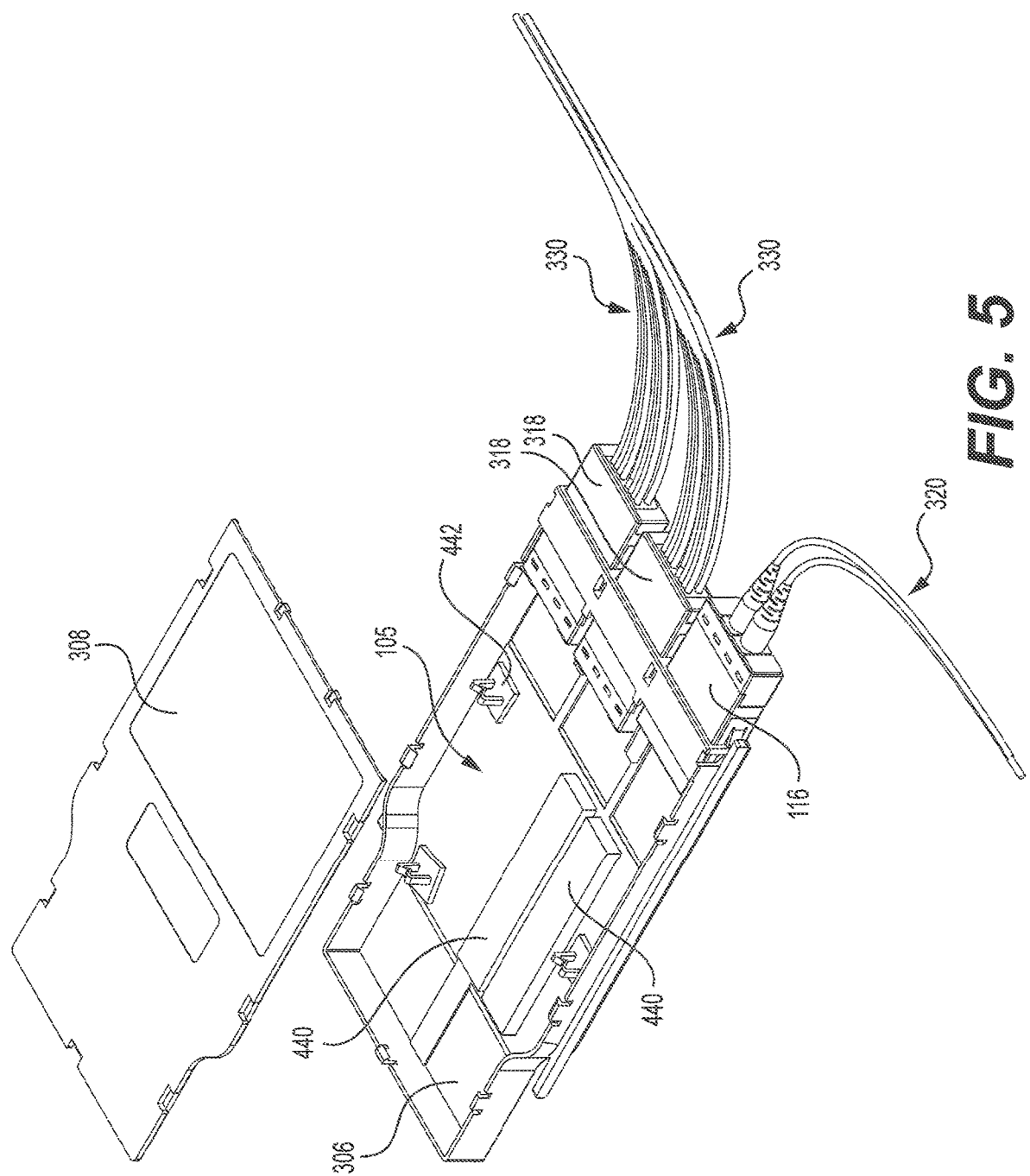
FIG. 5 is another perspective view of the exemplary module of FIG. 4.

Referring now to FIGS. 4 and 5, another exemplary embodiment of a module 300 for fiber optic cable distribution systems is illustrated according to various aspects of the disclosure. The module 300 may also be referred to as a cassette or a cartridge. The module 300 is configured to be mounted in any fiber distribution hub or enclosure that includes a chassis 590, such as that shown in FIGS. 7-10, having compartments 592 with rails 593 into which the module 300 can be snap-fit, as will be described in more detail below.

The module 300 has a front end 304 and a rear end 302. In some embodiments, the module 300 can be configured to provide all cable inputs and outputs at the front end 304 of the module 100, as shown in FIGS. 4 and 5. In such embodiments, the front end 304 of the module 300 includes a number of openings 310 each configured to receive a fiber interface housing 315. In the embodiment of FIGS. 4 and 5, the module 300 includes three openings 310 that are each configured to match the size and shape of an opening that is configured to receive a standard LC quad adapter or a standard SC duplex adapter. In some aspects, the module 300 may include more or less than three openings, with each opening being any desired size and shape, including openings configured to receive conventional adapters or non-conventional adapters. For example, in some embodiments, the module 300 may include six openings that are each configured to match the size and shape of an opening that is configured to receive a standard LC duplex adapter or a standard SC simplex adapter. In other embodiments, for example, the module 300 may include twelve openings each configured to match the size and shape of an opening that is configured to receive a standard LC simplex adapter.

Figure 6:
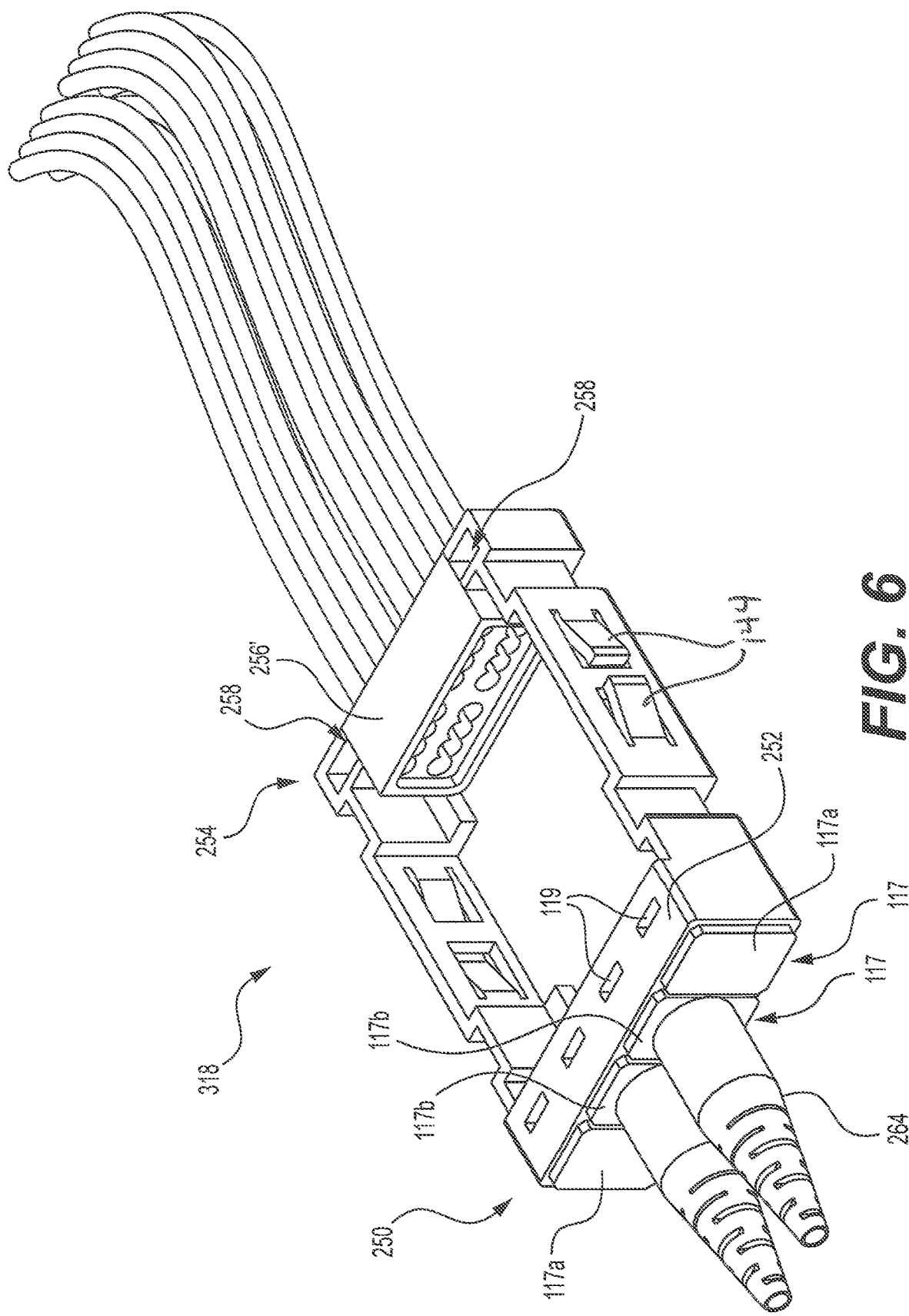
FIG. 6 is an exploded view of an exemplary interface housing used in the exemplary module of FIG. 4.
Figure 7:
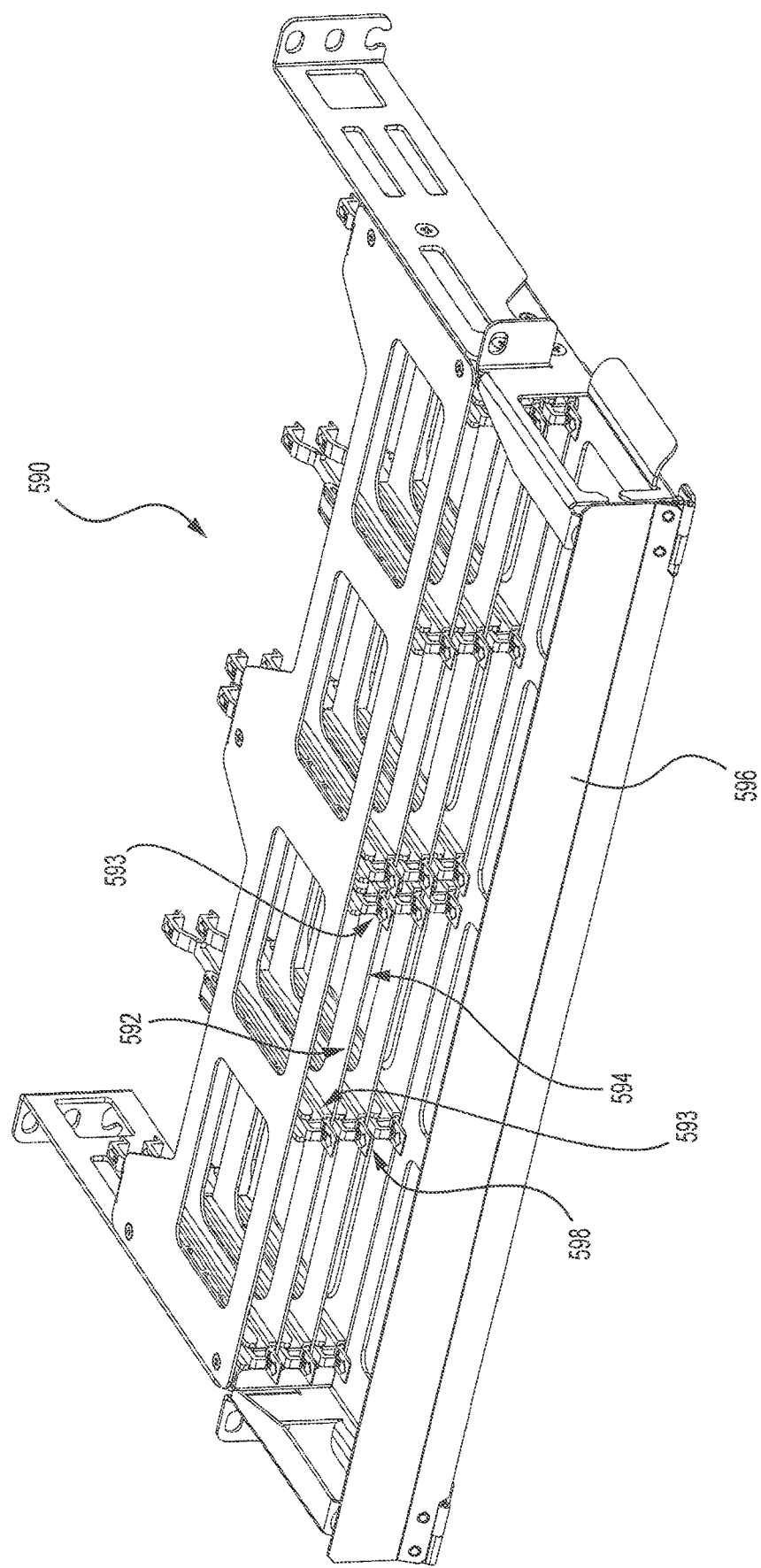
FIG. 7 is a perspective view of a chassis configured to receive the exemplary modules of FIGS. 1 and 3-5.
Figure 8:
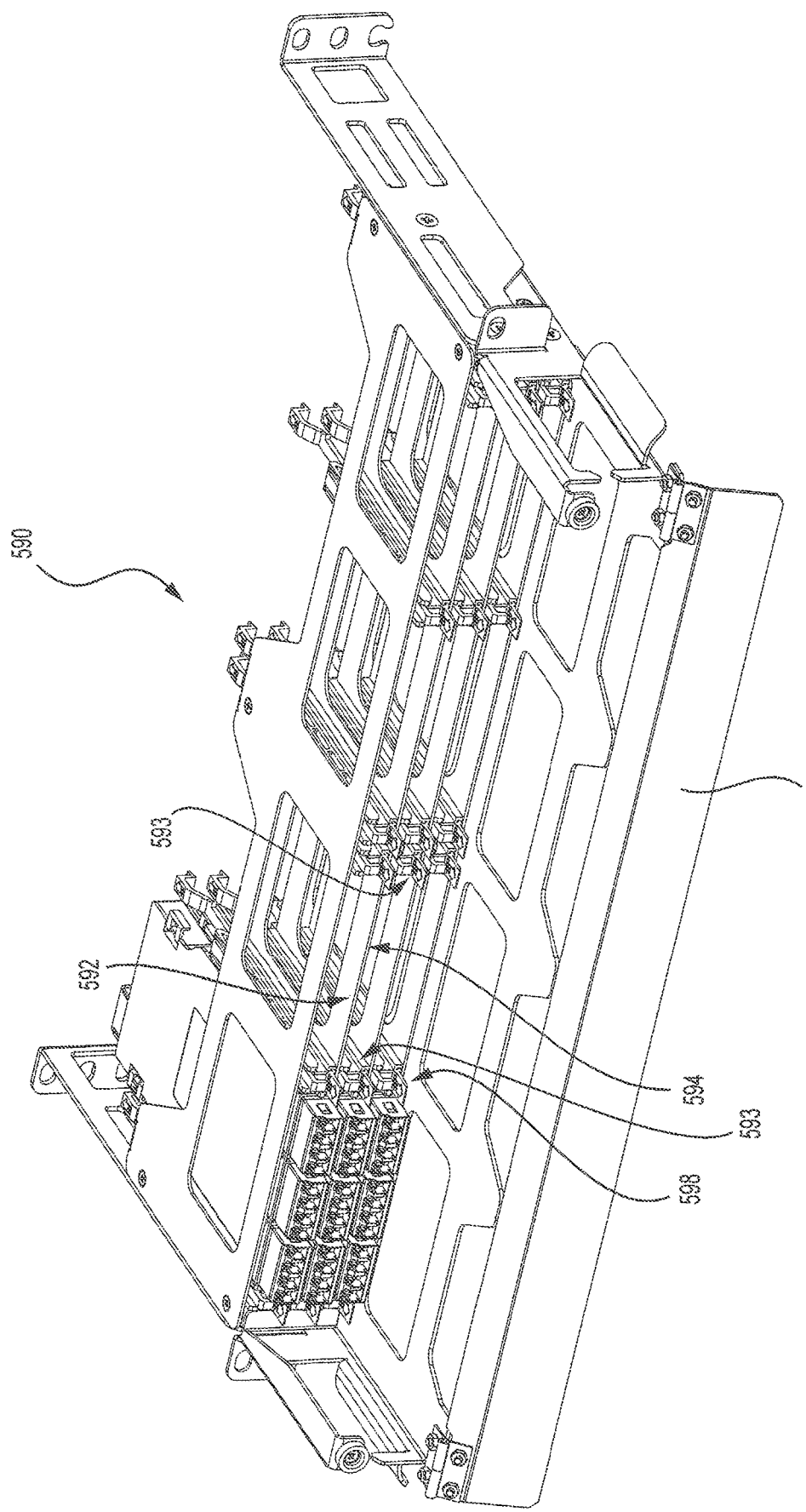
FIG. 8 is a perspective view of the chassis of FIG. 7 with the access door in an opened position.
Figure 9:
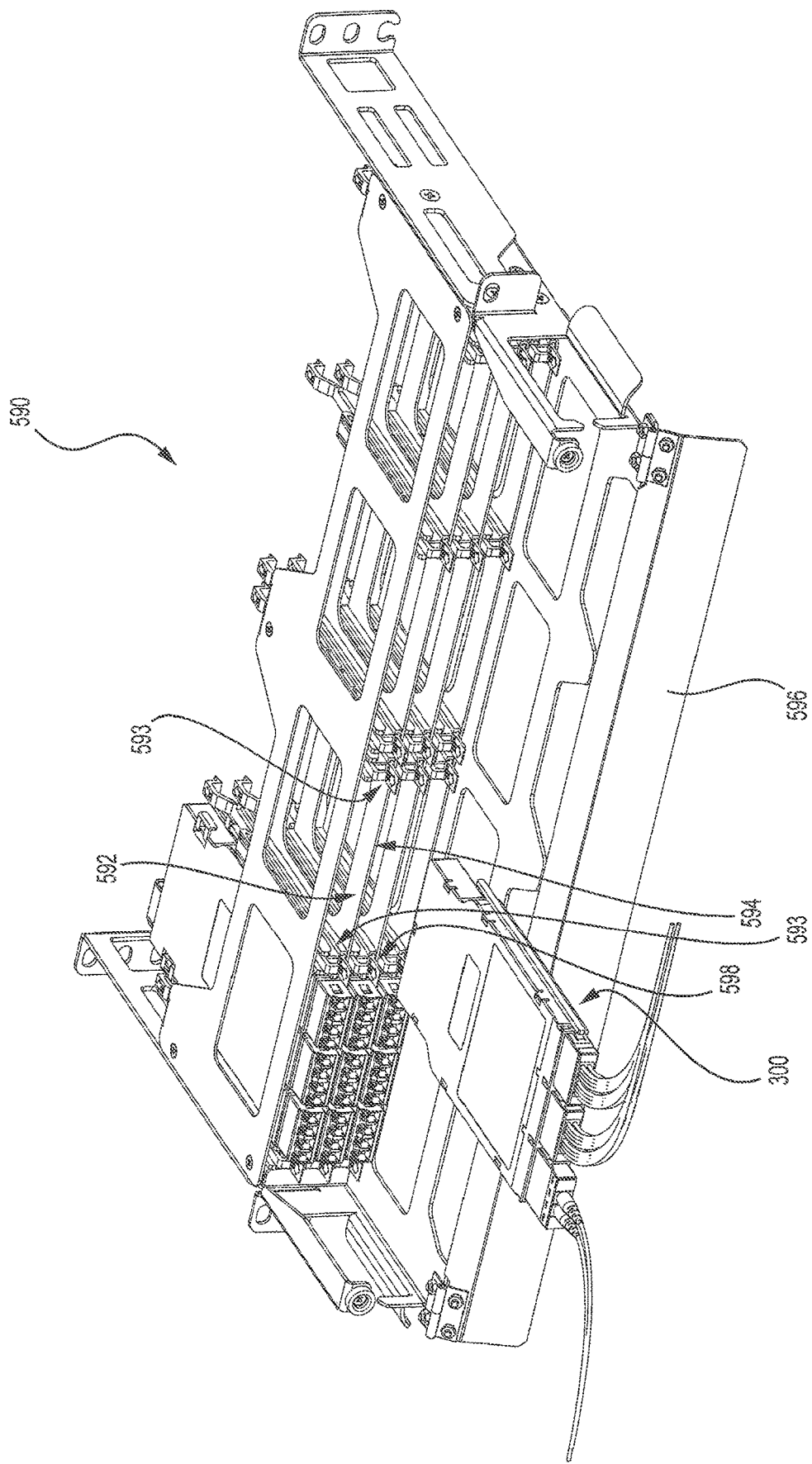
FIG. 9 is a perspective view of the chassis of FIG. 7 with the access door in an opened position as the exemplary module of FIG. 4 is being inserted.
Figure 10:
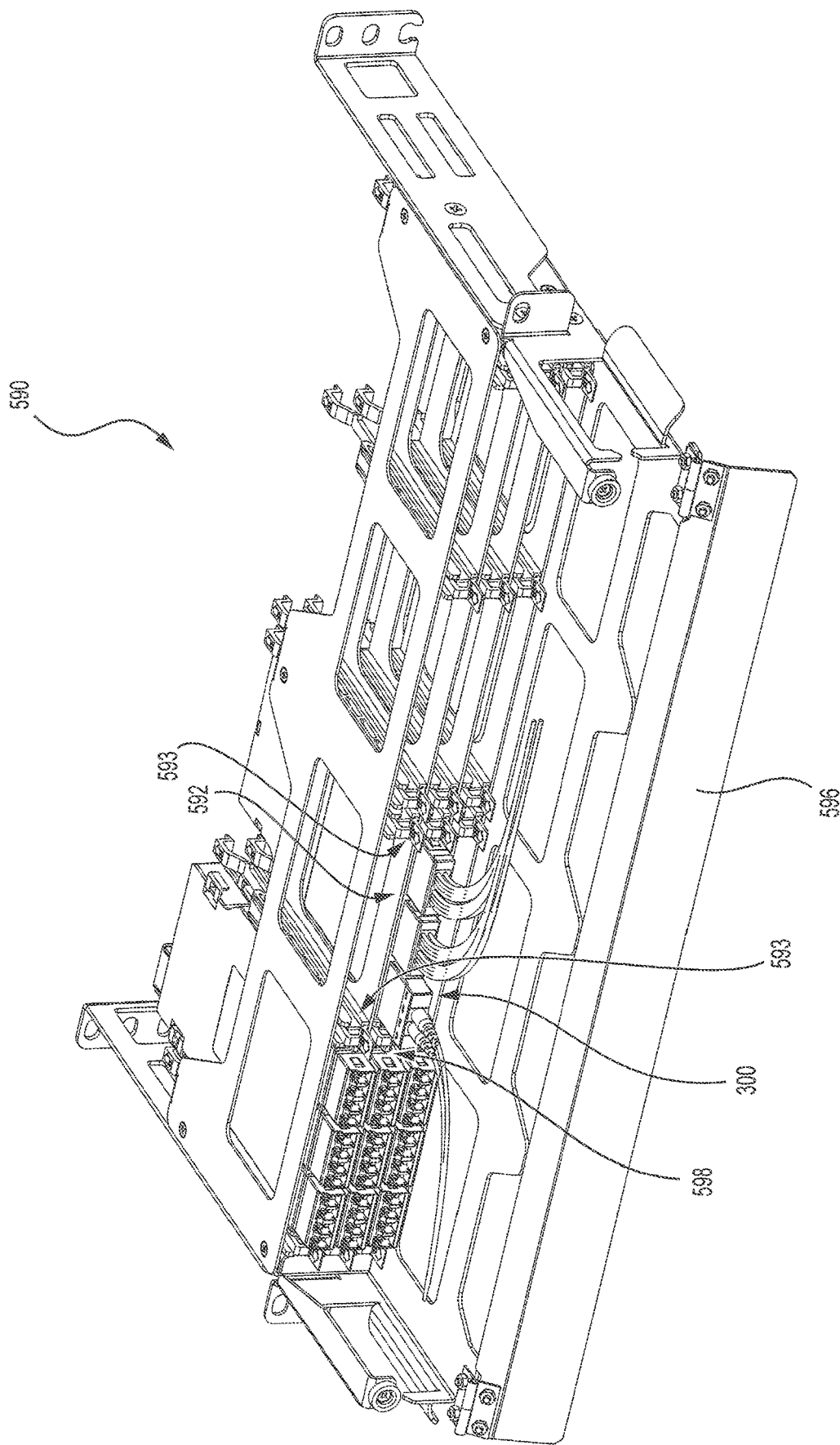
FIG. 10 is a perspective view of the chassis of FIG. 7 with the access door in an opened position and the exemplary module of FIG. 4 inserted.

Referring again to the exemplary embodiment of FIGS. 4 and 5, the fiber interface housings 315 may include an input housing 316 and two output housings 318. In the embodiment of FIGS. 4 and 5, the input housing 316 and the output housings 318 are sized and shaped to match the size and shape of a standard LC quad adapter (or a standard SC duplex adapter). As best illustrated in FIG. 6, in some embodiments, one or more of the fiber interface housings 315 may comprise a body that includes a first end 250 and a second end 254. The first end 250 may be configured to receive four interface plugs 117. For example, each of the plugs 117 may include a projection 121 extending from the top and/or the bottom wall of the plug 117. The housings 315 may include one or more openings 119 in the top wall 252 and/or the bottom wall configured to receive the projection (s) 121 in a snap-fit relationship, for example. Of course, any means for coupling the plugs 117 with the housing 315 may be used. It should be understood that the first end 250 may include a separate opening configured to receive each one of the plugs 117, or the first end 250 may include one or more openings that are each configured to receive more than one of the plugs 117. It should also be understood that the first end 250 may be configured to receive more or less than four plugs.

As shown in FIG. 2, the second end 254 of the fiber interface housing 315 may be configured to receive one interface plug 656. For example, the second end 254 may define openings 258 configured to receive projections 259 extending from side walls of the plug 256. A top portion 260 can be attached to a bottom portion 262 of the housing 315 to maintain the plug 656 in the openings 258.

The fiber interface housing 315 may include blank interface plugs 117a and/or populated interface plugs 117b. Referring to the exemplary embodiment of FIG. 6, the housing 315 includes two blank interface plugs 117a and two populated interface plugs 117b. The populated plugs 117b may include a boot 264 configured to provide strain relief to a fiber optic cable that passes through the boot 264. Each boot 264 may be coupled to a port 127 of the plugs 117b via a connecting member 129. In some embodiments, interface plug 256 may include a plurality of openings 266 that permit a fiber optic cable to pass through the second end 254 of the housing 315 and into an interior 105 of the module 300.

As shown in the exemplary embodiment of FIGS. 4 and 5, furcation cables 320 can be coupled with each of the boots 264. The furcation cables 320 direct optical fibers (not shown) to the interior 105 of the module 300. Each of the furcation cables 320 may include a fiber optic cable (not shown) therein. Each fiber optic cable may contain one or more optical fibers. For example, in some embodiments, each furcation cable 320 may include one fiber optic cable that contains one optical fiber. In other embodiments, each furcation cable 320 may include one fiber optic cable that includes two optical fibers. It should be understood that any desired configuration of fiber optic cables and optic fibers can be implemented.

In the exemplary embodiment of FIGS. 4 and 5, each of the two furcation cables 320 includes one fiber optic cable, and each fiber optic cable includes one optical fiber. Each of the fiber optic cable passes through a respective one of the boots 264 and one of the interface plugs 117b, through the input interface housing 316, out the opening 266 of the interface plug 256, and into the interior 105 of the module 300. Within the module 300, the optical fiber of the fiber optic cable is optically coupled (e.g., spliced) with a splitter, for example, as an input to a 1×16 optical splitter 440. Sixteen optical fibers (not shown) are optically coupled (e.g., spliced) to outputs of the 1×16 optical splitter 440. The sixteen optical fibers may run individually from the optical splitter 440 to one of the output interface housings 318, or the sixteen optical fibers may be bundled into one or more fiber optic cables. The sixteen optical fibers pass through the boots 264 and the interface plugs 117b and into the input interface housing 316. For example, the eight of the sixteen optical fibers may pass through each of the boots 264 and interface plugs 117b, and each of the optical fibers is broken out into separate optical fiber cables that pass through the openings 266 of the interface plug 656 and into one of the furcation cables 330. Each of the optical fiber cables passing through the furcation cables 330 has an end distal of the module 300 that is terminated with an optical fiber connector such as, for example, an LC connector, an SC connector, or the like.

As described above, the module 300 has a front end 304 that is sized to received three conventional LC quad adapters (or three conventional SC duplex adapters). The three conventional LC quad adapters would provide twelve ports at the front end 304 of the module 300. Thus, provided that the module 300 could include an input cable at the rear end 302, the maximum number of outputs that could be made at the front end 304 of the module 300 would be twelve LC connections (or six SC connections). However, according to the embodiment of FIGS. 4-6, the module 300 can provide sixteen optical fiber outputs at each of the two output interface housings 318, which results in thirty-two optical fiber outputs, while additionally providing optical fiber inputs at each of two of the interface plugs 117a. Also, the configuration of the module 300 and the interface housing 318 permits the thirty-two optical fiber outputs to be connectorized downstream a distance from the module 300. For example, in some embodiments, the furcation cables 330 may be seven meters. Thus, the front end 304 of the module is not congested, and a technician can more easily access the individual cables 330 for connection to a fiber optic adapter in order to provide signals to different locations of the FTTx network.

The rear ends 102, 302 of the modules 100, 300 are configured to be received in one of the compartments 592 of the chassis 590 when the module 100 is snap-fit into the chassis 590 and the front ends 104, 304 are configured to be at an opening 594 to the compartment 592 and accessible by a user when the module 100 is snap-fit into the chassis 590.

As shown in FIGS. 7-10, the chassis 590 includes a pivotal door 596 that covers the module rails 592 and the modules (e.g., 100, 300, etc.) that are inserted into the module rails 592. When a new module is to be inserted (or removed), the door 596 is pivoted downward to allow access to the module rails 592. The module 300 (or 100) is then inserted into one of the module rails 592 include it is secured or locked into position, for example, via a snap-fit engagement or any other conventional coupling structure. For example, each of the module rails 592 may include a lock member 598 that is configured to secure the module 300 (or 100) in position. If a module needs to be removed or replaced, the lock member 598 can be actuated by pressing downward, for example, to release the module from the module rail 592 and allow the module to be pulled and removed from the module rail 592.

In other embodiments, the module 190, 390 can be replaced by an optical cable module (not shown) that does not include a splitter. For example, the input cables may contain a plurality of bundled optical fibers. The optical cable module can be configured to optically coupled the plurality of bundled optical fibers with the output adapters 318 having breakout members that break out the optical fibers into separate optical fiber cables.

Indeed, the modular nature of the modules 190, 390 and the optical cable module allows for various configurations to accommodate desired FTTx applications. Further, the modules 190, 390 and the optical cable module provide all of the optical cable interfaces at the front end 104, 304 of the module 190, 390 so that the interfaces are easily accessible when inserted into the module rails 592 of the chassis 590 for convenient access by a technician.

Figure 11:
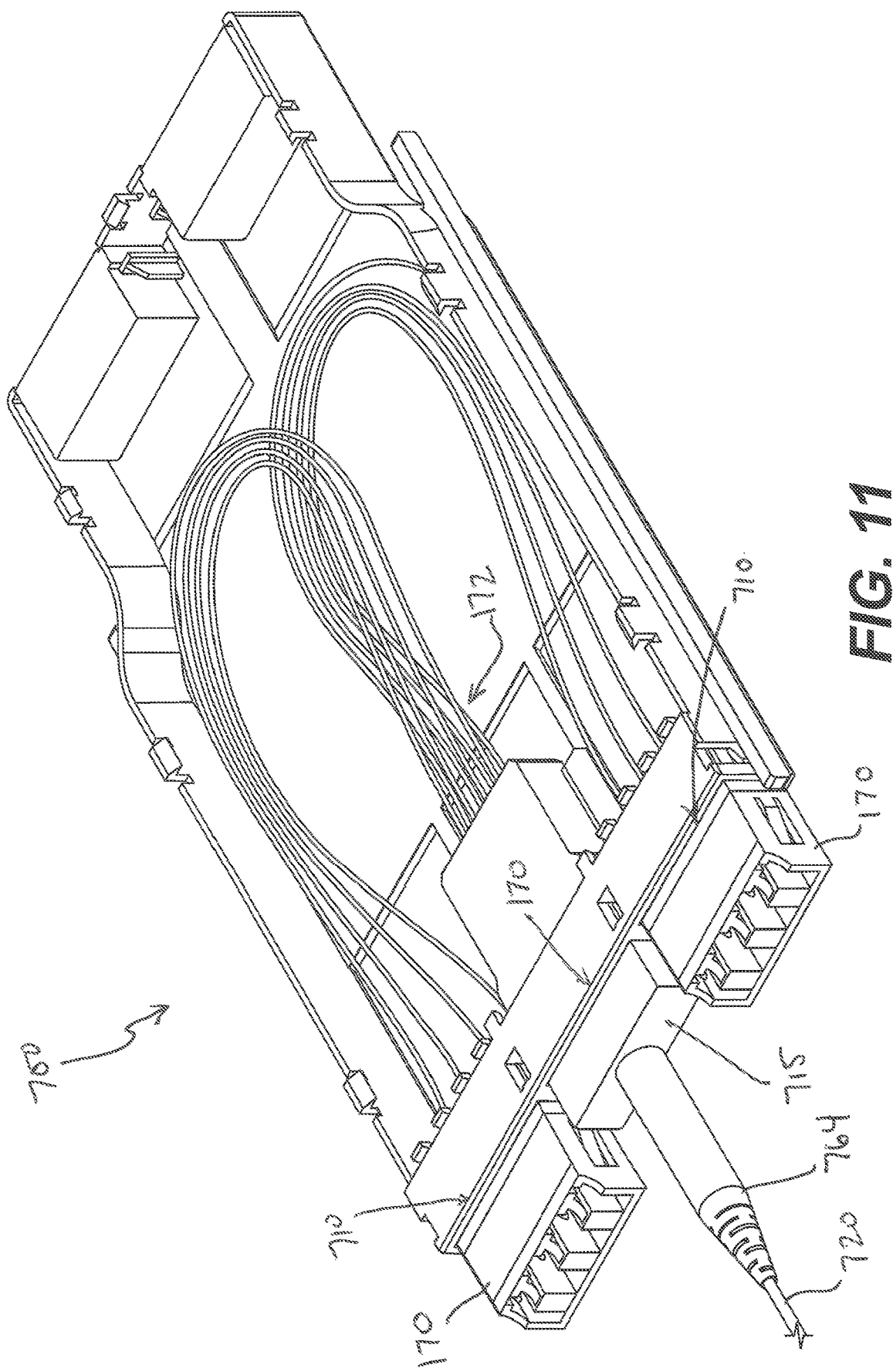
FIG. 11 is a perspective view of another exemplary module in accordance with various aspects of the present disclosure.

Additional embodiments include any one of the embodiments described above, where one or more of its components, functionalities or structures is interchanged with, replaced by or augmented by one or more of the components, functionalities, or structures of a different embodiment described above. For example, as shown in FIG. 11, an exemplary module 700 may include two openings 710 populated with standard LC quad connectors 170, and a third opening 710 populated with an interface housing 715 that is configured as a fiber breakout. For example, a furcation cable 720 containing eight optical fiber cables 172 may be coupled with the interface housing 715 such that the eight fiber optic cables 172 pass through a boot 764 and into the interface housing 715. The eight fiber optic cables 172 may be broken out in the interface housing 715 and output from the housing 715 as eight individual fiber optic cables 172 that are each connected to one of the ports of the LC quad connectors 170.

Figure 12:
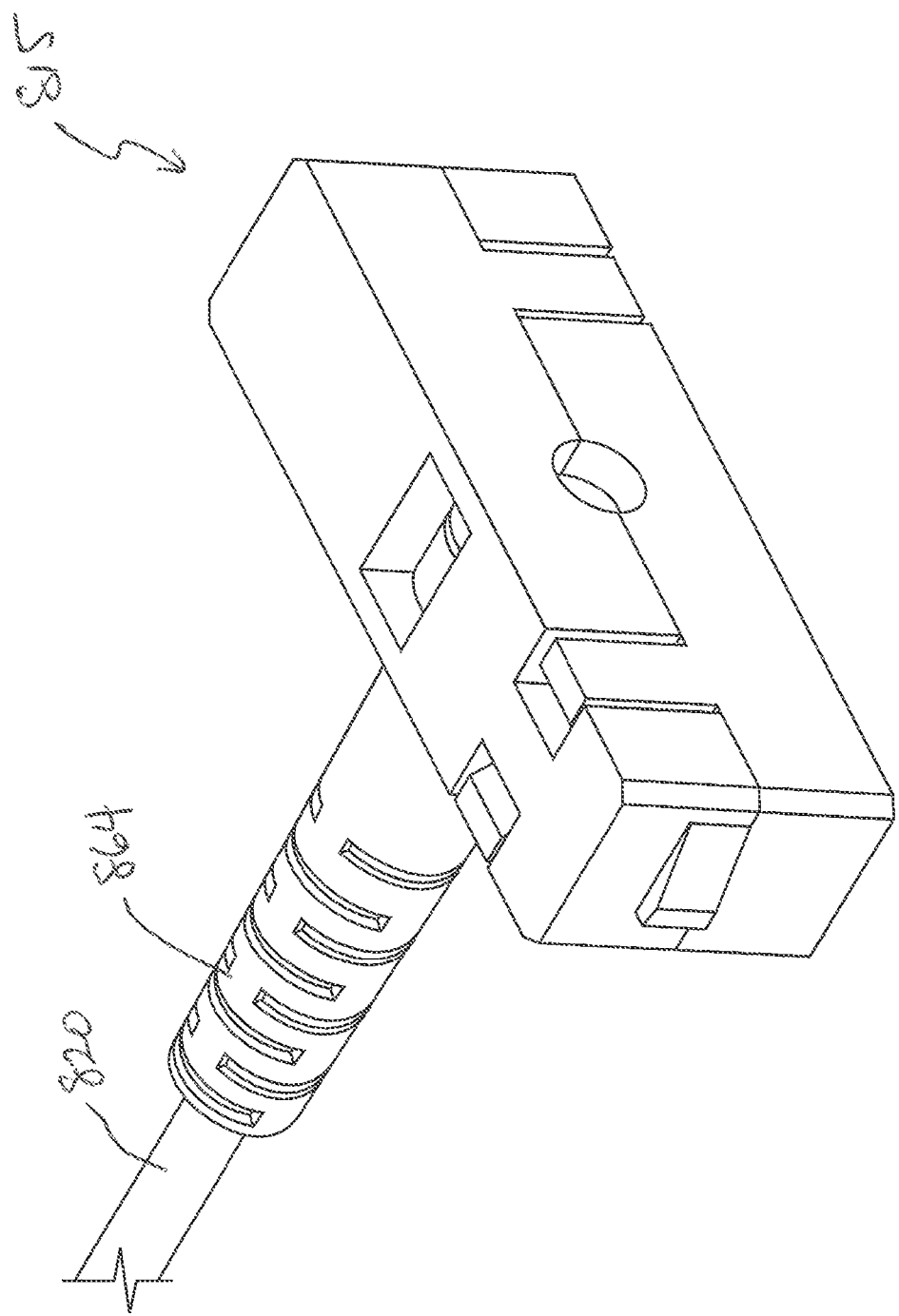
FIG. 12 is a perspective view of an exemplary interface housing used in the exemplary module of FIG. 11.

In some aspects, as shown in FIG. 12, an interface housing 815 can include a boot 864 that provides strain relief to a fiber optic cable (not shown) that passes through a furcation cable 820, through the housing 815, and into a module (not shown). The fiber optic cable can be optically connected to a splitter, or broken out into separate fiber optic cables (if a multi-fiber cable), or connected with any passive component.

Figure 13:
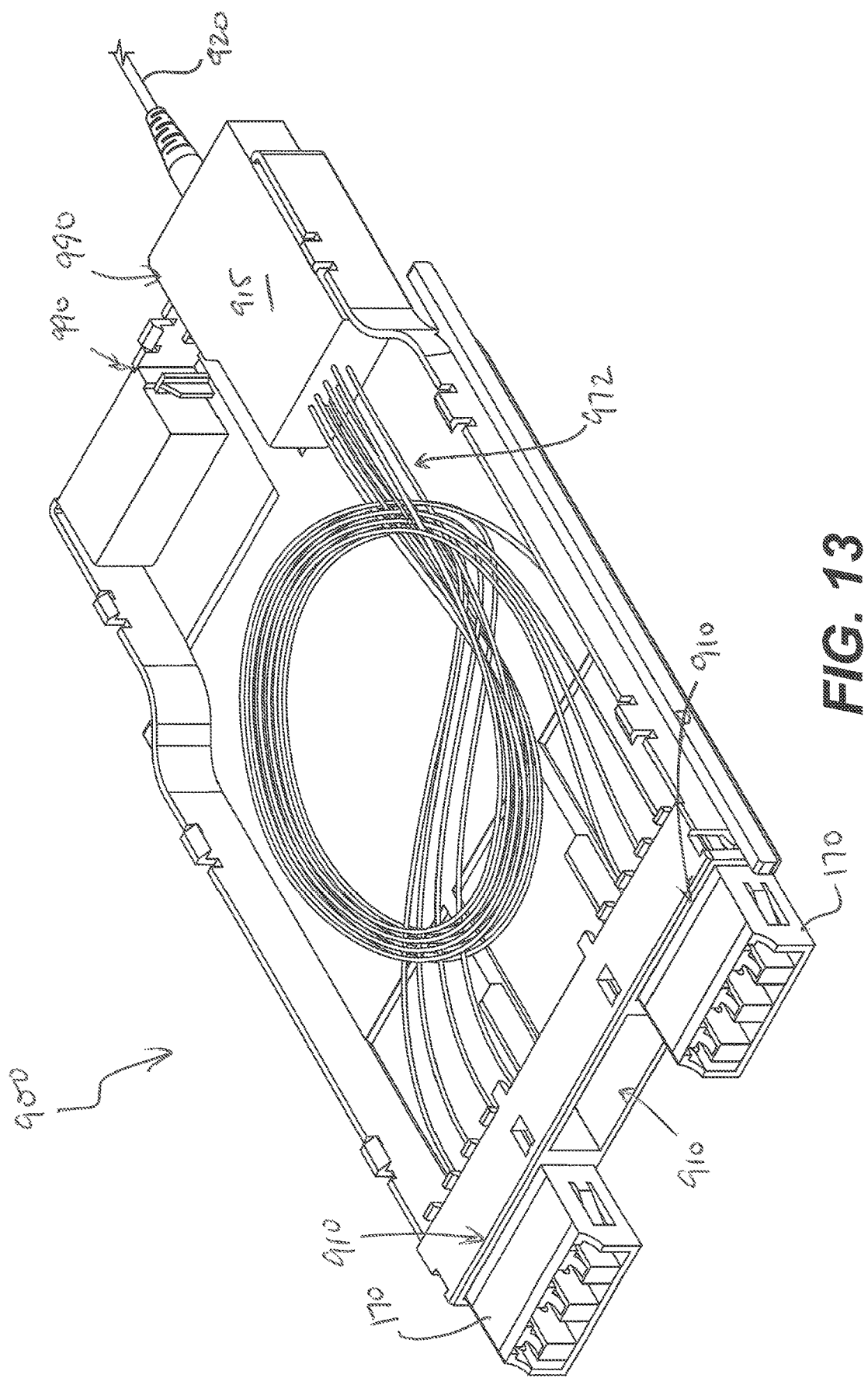
FIG. 13 is a perspective view of another exemplary module in accordance with various aspects of the present disclosure.

In another embodiment, as shown in FIG. 13, an exemplary module 900 may include three front openings 910 and one or more rear openings 990. One or more of the front openings 990 can be populated with standard LC quad connectors 170, and the rear opening 990 populated with an interface housing 915 that is configured as a fiber breakout. For example, a furcation cable 920 containing eight optical fiber cables 972 may be coupled with the interface housing 915 such that the eight fiber optic cables 972 pass through a boot 964 and into the interface housing 915. The eight fiber optic cables 972 may be broken out in the interface housing 915 and output from the housing 915 as eight individual fiber optic cables 972 that are each connected to one of the ports of the LC quad connectors 170.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. An optical fiber interface housing comprising:
   a body having a first end and an opposite second end having an optical fiber body receiving portion;
   an optical fiber connecting portion configured to be removably coupled with the body at the first end of the body;
   a boot coupled with the optical fiber connecting portion;
   wherein the boot and the optical fiber connecting portion are configured to receive a fiber optic cable containing at least one optical fiber and to permit the at least one optical fiber to pass through the body from the first end to the second end after passing through the boot and/or the optical fiber connecting portion;
   wherein the optical fiber body receiving portion is configured to receive the at least one optical fiber and to permit the at least one optical fiber to pass through an opening and exit the body; and
   wherein the first end of the body includes an opening configured to receive the optical fiber connecting portion.

2. The optical fiber interface housing of claim 1, further comprising a furcation cable coupled with the boot, and wherein the furcation cable is configured to receive the optical fiber and to permit the optical fiber to pass therethrough to a port.

3. The optical fiber interface housing of claim 1, wherein the optical fiber body receiving portion comprises an optical fiber body opening portion.

4. The optical fiber interface housing of claim 1, wherein the fiber optic cable comprises a multi-fiber cable containing a plurality of optical fibers.

5. The optical fiber interface housing of claim 4, wherein the plurality of optical fibers of the multi-fiber cable are broken out of the fiber optic cable in the body and pass separately through the optical fiber body receiving portion at the second end of the body.

6. The optical fiber interface housing of claim 4, further comprising a second optical fiber body receiving portion at the second end of the body, and wherein the plurality of optical fibers of the multi-fiber cable are broken out of the fiber optic cable in the body and pass separately through the second optical fiber body receiving portion at the second end of the body.

7. The optical fiber interface housing of claim 1, wherein the first end of the body includes a body plug receiving portion configured to receive a plug configured.

8. The optical fiber interface housing of claim 7, wherein the plug comprises the optical fiber connecting portion.

9. The optical fiber interface housing of claim 8, wherein the body plug receiving portion comprises a body plug opening portion that is configured to receive at least a portion of the plug.

10. The optical fiber interface housing of claim 8, wherein the plug comprises a blank that is configured to block the body plug receiving portion.

11. The optical fiber interface housing of claim 1, wherein the body has a size and shape configured to match a size and shape of a Lucent Connector (LC) quad adapter or a size and shape of a Subscriber Connector (SC) duplex adapter.

12. A module configured to be mounted in a chassis of a fiber distribution system, the module comprising:
a module body having a front end and a rear end; and
a module body receiving portion located adjacent to the front end and configured to receive the optical fiber interface housing of claim 1 such that the first end of the body is exposed at an exterior of the front end of the module body.

13. The module of claim 12,
wherein the module body receiving portion comprises a module body opening portion.

14. A module configured to be mounted in a chassis of a fiber distribution system, the module comprising:
a module body having a front end a rear end;
an opening at the front end configured to removably receive an optical fiber interface housing, the optical fiber interface housing having
 a body having a first end and an opposite second end;
 a port at the first end of the body;
 an opening at the second end of the body; and
 a boot coupled with the port;
 wherein the boot and the port are configured to receive a fiber optic cable containing at least one optical fiber and to permit the at least one optical fiber to pass through the body from the first end to the second end; and
 wherein the opening is configured to receive the at least one optical fiber and to permit the at least one optical fiber to pass through the opening and exit the body;
a splitter at an interior of the module body; wherein the at least one optical fiber is optically coupled to an input of the splitter; and
a second opening at the front end, the second opening being configured to removably receive a second optical fiber interface housing;
wherein a plurality of optical fibers that are optically coupled to outputs of the splitter are configured to pass through the second optical fiber interface housing.

15. The module of claim 14, wherein the plurality of optical fibers are contained in a multi-fiber cable and are broken out from the multi-fiber cable in the second optical fiber interface housing and separately exit the second optical fiber interface housing.

16. The module of claim 15, wherein the second optical fiber interface housing includes a plurality of furcation cables configured to receive respective ones of the plurality of optical fibers as the plurality of optical fibers exit the second optical fiber interface housing.

17. The module of claim 14, wherein the plurality of optical fibers are contained in a multi-fiber cable that passes through and exits the second optical fiber interface housing.

18. The module of claim 15, wherein the multi-fiber cable is coupled with a breakout a distance downstream of the second optical fiber interface housing; and
wherein the plurality of optical fibers are broken out of the multi-fiber cable at the breakout and separately pass through respective ones of a plurality of furcation cables after exiting the breakout.

19. The module of claim 12, wherein the fiber optic cable comprises a multi-fiber cable that includes g a plurality of optical fibers, and wherein the plurality of optical fibers of the multi-fiber cable are broken out of the fiber optic cable in the module body and pass separately through the module body receiving portion.

20. The module of claim 19, further comprising a second module body receiving portion at the front end, the second module body receiving portion being configured to removably receive a Lucent Connector (LC) quad adapter or a Subscriber Connector (SC) duplex adapter, and wherein each of the plurality of optical fibers is optically coupled to a port of the LC quad adapter or the SC duplex adapter.

21. The optical fiber interface housing of claim 7, wherein the body plug receiving portion comprises a plurality of body opening portions, and the plug comprises a plurality of plugs that include a blank portion that is configured to block at least one of the plurality of body opening portions.

22. The optical fiber interface housing of claim 1, wherein the interface housing is configured to provide different input/output configurations at least adjacent to the first body end portion of the body portion.

* * * * *